United States Patent [19]

Koch

[11] 4,116,214
[45] Sep. 26, 1978

[54] STEERING CLUTCH AND SINGLE PEDAL BRAKE CONTROL SYSTEM FOR CRAWLER TRACTOR

[75] Inventor: George Paul Koch, Springfield, Ill.

[73] Assignee: Fiat-Allis Construction Machinery, Inc., Deerfield, Ill.

[21] Appl. No.: 783,203

[22] Filed: Mar. 31, 1977

Related U.S. Application Data

[62] Division of Ser. No. 640,753, Dec. 15, 1975, Pat. No. 4,042,052.

[51] Int. Cl.² ............................................. F16K 15/18
[52] U.S. Cl. ................................................... 137/522
[58] Field of Search ................... 251/14, 63; 137/312, 137/522; 192/4 A, 13 R, 109 F

[56] References Cited

U.S. PATENT DOCUMENTS

| 1,648,710 | 11/1927 | Wright | 251/14 |
|---|---|---|---|
| 2,928,646 | 3/1960 | Ashbrook | 251/63 |
| 3,729,020 | 4/1973 | Koci et al. | 137/522 |

FOREIGN PATENT DOCUMENTS 1,141,604  1/1969  United Kingdom ..................... 251/14

Primary Examiner—Martin P. Schwadron
Assistant Examiner—A. Michael Chambers
Attorney, Agent, or Firm—Thomas F. Kirby; Robert A. Brown; Harvey W. Rockwell

[57] ABSTRACT

A crawler tractor has an engine-driven transmission for supplying motive power to the left and right crawler tracks through spring-applied fluid-released left and right steering clutches and also has spring-applied fluid-released track brakes. A hydraulic steering clutch and brake control system is provided and includes left and right manually operable steering levers for the clutches and a single foot-operated brake pedal. The control system further includes a single pump for supplying hydraulic fluid to the steering clutches and to the brake actuators for the brakes. A steering valve, having a flow divider therein, receives fluid from the pump and is responsive to actuation of the steering levers to supply fluid to release the steering clutches. The steering valve also continually directs fluid to a pilot operated shuttle valve which is responsive to operation of the steering clutches to direct operating fluid to the brake actuators to effect brake release for that track whose clutch is engaged. A combined pressure relief valve, brake valve and brake inhibitor valve is provided and operates in response to the brake pedal and is also responsive to fluid pressure in the tractor transmission. The control system operates so that actuation of either steering lever from neutral effects fluid release of its associated steering clutch, whereupon depression of the single brake pedal will then operate the combined valve to effect spring application of the brake for that track whose clutch is released. If both steering levers are in neutral and transmission fluid pressure drops below a predetermined value, as during reverse shifting to change direction of tractor travel, the combined valve effects automatic spring-application of both brakes, without loss of fluid pressure necessary for control of the steering clutches.

6 Claims, 1 Drawing Figure

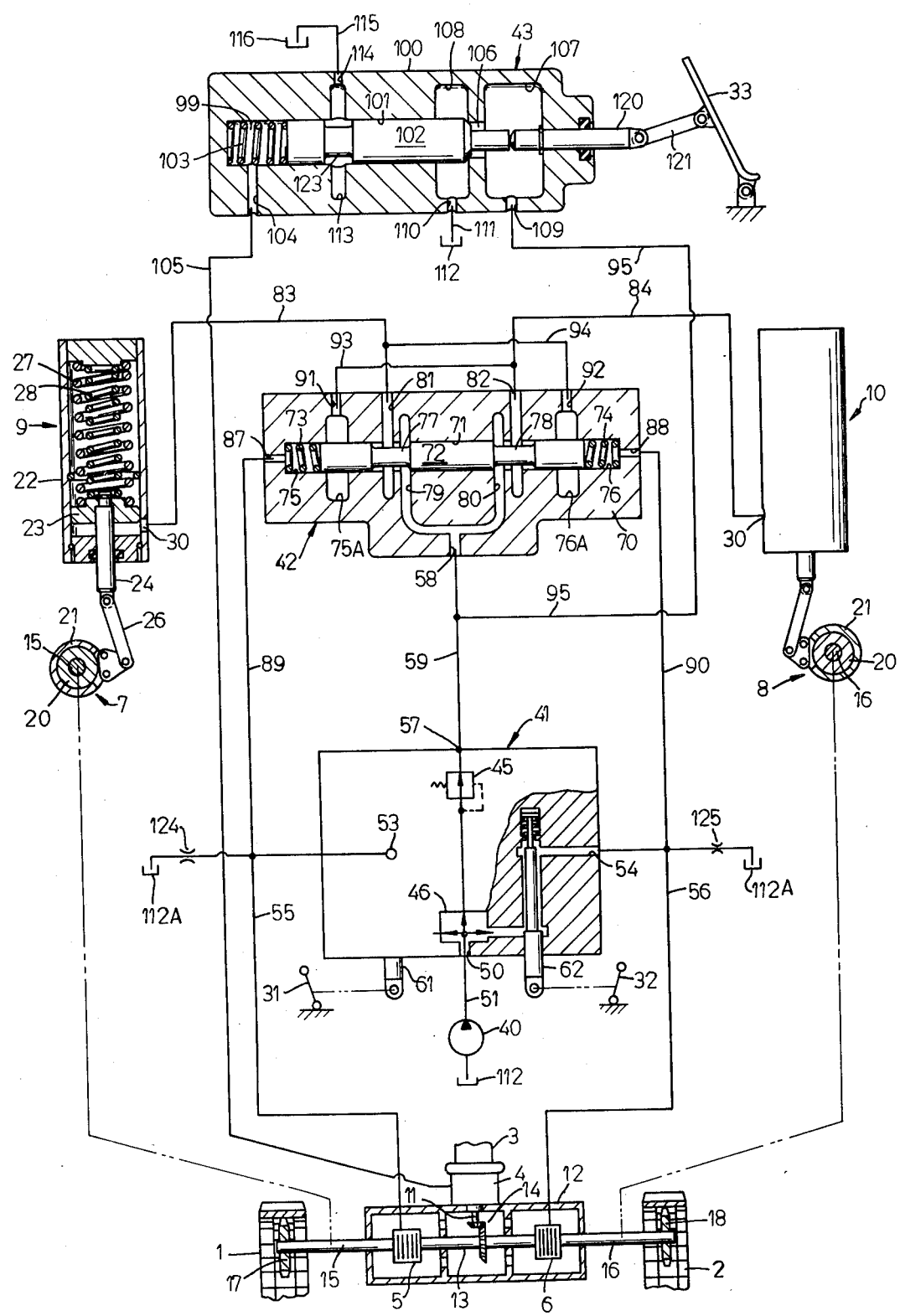

STEERING CLUTCH AND SINGLE PEDAL BRAKE CONTROL SYSTEM FOR CRAWLER TRACTOR sp

This is a division, of application Ser. No. 640,753, filed Dec. 15, 1975 now U.S. Pat. No. 4,042,052.

BACKGROUND OF THE INVENTION

1. Field of Use

This invention relates generally to a hydraulic steering clutch and single pedal brake control system for steering and braking vehicles such as crawler tractors.

2. Description of the Prior Art

In some prior art crawler tractors the hydraulic control system for the steering clutches and the track brakes includes a pair of manually operated steering clutch levers which actuate the valves for the steering clutches which transmit motive power from the tractor transmission to the tracks. A pair of brake pedals are used to selectively actuate a pair of brake cylinders which, in turn, control a pair of brakes for the tracks. Straight line vehicle movement is accomplished by engaging both clutches so as to drive both tracks in the same direction at the same speed. Steering is accomplished by operating one steering clutch lever so as to disengage its associated steering clutch and thereby slow down or stop its associated track while continuing to drive the other. Braking is accomplished during straight line vehicle movement by using both brake pedals and, during steering, by using the brake pedal for that track whose clutch is disengaged.

In such prior art tractors the steering clutches and the brake actuators are sometimes embodied in separate control systems which are supplied from separate hydraulic pumps. Aside from increased costs of such systems resulting from redundancy of components, such prior art systems often lack various automatic control functions which, if provided, would simplify and provide for safer tractor operation. The following U.S. Pat. Nos. disclose various types of prior art steering and braking control systems for vehicles: 3,437,184; 3,358,786; 3,386,523; 3,351,149; and 2,375,959.

SUMMARY OF THE INVENTION

A crawler tractor has an engine driven transmission for supplying motive power to the left and right crawler tracks through spring-applied fluid-released left and right steering clutches and also has spring-applied fluid-released track brakes. A hydraulic steering clutch and brake control system is provided and includes left and right manually operable steering levers for the clutches and a single foot-operated brake pedal. The control system further includes a single pump for supplying hydraulic fluid to the steering clutches and to the brake actuators for the brakes. A steering valve, having a flow divider therein, receives fluid from the pump and is responsive to actuation of the steering levers to supply fluid to release the steering clutches. The steering valve also continually directs fluid to a pilot operated shuttle valve which is responsive to operation of the steering clutches to direct operating fluid to the brake actuators to effect brake release for that track whose clutch is engaged. A combined pressure relief valve, brake valve and brake inhibitor valve is provided and operates in response to the brake pedal and is also responsive to fluid pressure in the tractor transmission. The control system operates so that actuation of either steering lever from neutral effects fluid release of its associated steering clutch, whereupon depression of the single brake pedal will then operate the combined valve to effect spring application of the brake for that track whose clutch is released. If both steering levers are in neutral and transmission fluid pressure drops below a predetermined value, as during reverse shifting to change direction of tractor travel, the combined valve effects automatic spring-application of both brakes without loss of fluid pressure necessary for control of the steering clutches.

A control system in accordance with the invention requires fewer duplicate components than prior art systems, is easier to operate and more reliable in operation. The system provides for a single brake pedal usable for steering and braking. The system employs fail-safe spring-applied brakes, requires only one pump for supplying the steering clutches and brake actuators, and enables automatic braking when the steering levers are in neutral and transmission fluid pressure drops, as during tractor direction reversal. The system employs an improved yet relatively umcomplicated pedal operated combined valve to enable selective as well as automatic braking. Other objects and advantages will hereinafter appear.

DRAWINGS

The single FIGURE is a schematic diagram of a control system in accordance with the invention.

DESCRIPTION OF A PREFERRED EMBODIMENT

Referring to the drawing, a crawler tractor has left and right crawler tracks 1 and 2, respectively, on opposite lateral sides thereof, an engine 3 for driving a transmission 4 to supply motive power to the tracks through conventional spring-applied fluid-released right and left steering clutches 5 and 6, and conventional spring-applied fluid-released left and right brakes 7 and 8, respectively, which are actuated by left and right brake actuators 9 and 10, respectively. The tractor also comprises manually operable left and right steering clutch control levers 31 and 32 and a single brake pedal 33.

Transmission 4 is a power shift transmission for driving the tractor and has an output shaft 11 which extends into a housing 12 to drive a main shaft 13 through bevel gears 14. Main shaft 13 is connectable through the clutches 5, 6 when the latter are engaged to drive the left and right final drive shafts 15 and 16, respectively, to which track drive sprockets 17 and 18, respectively, are affixed.

Each brake 7, 8 comprises a brake drum 20 for the final drive shaft 15, 16 and a brake band 21 engageable with the brake drum. Each brake actuator 9, 10 comprises a housing 22 having a piston 23 therein for moving a piston rod 24 attached thereto which extends from the housing. Each housing 22 is rigidly secured to the tractor frame by means not shown. Each piston rod 24 is connected by a linkage 26 to an associated brake band 21. Each brake actuator 9, 10 comprises biasing spring means in the form of a pair of balanced compression springs 27 and 28 within its housing 22 for biasing the piston 23 in one direction to a position toward one end of the housing wherein brake band 21 fully engages its brake drum 20 and the brake 7, 8 is applied. Each housing 22 further comprises a fluid inlet port 30 for admitting fluid between the piston 23 and the said one end of the housing to effect piston movement in the opposite direction to release the brake 7, 8.

The control system for steering and braking includes a single engine-driven pump 40 for supplying fluid to operate the steering clutches 5, 6 and the brake actuators 9, 10; a steering valve 41 responsive to actuation of the steering levers 31, 32 to supply fluid to release the steering clutches 5, 6; a pilot operated shuttle valve 42 responsive to operation of the steering clutches 5, 6 to direct operating fluid to cause the brake actuators 9, 10 to effect brake release, and a combined pressure relief, brake and brake control inhibitor valve 43 and operated by a pedal 33 and responsive to transmission fluid pressure. The valve 43 may be considered as a brake control and fluid pressure control valve.

Generally speaking, the control system operates in such a manner that actuation of either steering lever 31, 32 effects fluid release of its associated steering clutch 5, 6 and operation of the single brake pedal 33 will then effect spring application of the brake 7, 8 for that track 1, 2 whose clutch 5, 6 is released. Similarly, if both steering levers 31, 32 are in neutral and transmission fluid pressure drops below a predetermined value, as during reverse shifting to change direction of tractor travel, both brakes 7, 8 are automatically spring-applied. Functions for both situations occur without loss of fluid pressure necessary for control of the steering clutches 5, 6 because of a pressure regulating sequence valve 45. If both steering levers 31, 32 are in neutral with both steering clutches 5, 6 engaged, operation of the single brake pedal 33 will then effect spring application of both brakes 7, 8 such as may be desirable during down hill coast.

Steering valve 41, which is understood to have a flow divider 46 and the pressure regulating sequence valve 45 therein, has a fluid inlet port 50 connected to pump 40 by a fluid line 51 and also has clutch supply ports 53 and 54 which are connected by fluid lines 55 and 56, respectively, to the clutches 5 and 6, respectively. Steering valve 41 also has a port 57 for supplying the fluid inlet port 58 of shuttle valve 42 through fluid line 59. Steering valve 41 is provided with left and right valve spools 61 and 62 which are connected for actuation by the steering levers 31 and 32, respectively. The spools 61 and 62 are normally biased in neutral position (wherein they prevent fluid flow from pump 40 to the clutches 5 and 6 and maintain the clutches spring-engaged) but are axially movable therefrom by the levers 31 and 32 to effect fluid flow from pump 40 to release the clutches 5 and 6, respectively. To ensure engagement of clutches 5 and 6 when valve spools 61 and 62 are in neutral position, bleed-down restrictor orifices 124 and 125 are provided to allow pressure fluid in lines 55 and 56 to escape to reservoir 112A.

Hydraulic fluid is also supplied from pump 40, through flow divider 46 and sequence valve 45 in valve 41 and line 59 to fluid inlet port 58 of shuttle valve 42. Shuttle valve 42 comprises a housing 70 having a bore 71 therein in which a shuttle valve spool 72 is slideably mounted and normally maintained in centered position by compression type centering springs 73 and 74 located in pilot pressure chambers 75 and 76 in the bore and disposed between the spool ends and the ends of the housing. Valve spool 72 is provided with a pair of spaced apart grooves 77 and 78 which are aligned or register with fluid flow passages 79 and 80, respectively, when the spool is centered. The passages 79 and 80 each of which communicates with fluid inlet port 58, communicates with the fluid ports 81 and 82, respectively, which are connected by fluid lines 83 and 84, respectively, to the ports 30 of the brake actuators 9 and 10. The pilot pressure chambers 75 and 76 of shuttle valve 42 have inlet ports 87 and 88 which are connected by lines 89 and 90, respectively, to the clutch supply lines 55 and 56, respectively. Pilot pressure sub-chambers 75A and 76B have outlet ports 91 and 92, respectively, which are cross-connected by lines 93 and 94, respectively, to the lines 84 and 83, respectively. When shuttle valve 42 is in neutral position, fluid from line 59 is divided and directed through the lines 83 and 84 to the brake actuators 9 and 10, respectively. Also, when shuttle valve 42 is in neutral position, fluid in lines 84, 83 and their respective cross-connected lines 93, 94, in ports 91, 92 and in sub-chambers 75A, 76A is prevented from communicating with fluid in pilot pressure chambers 75 and 76 by a slight overlap at both ends of shuttle valve spool 72 engagement with bore 71 of the pilot pressure chambers 75 and 76.

The actuators 9 and 10 are mechanically connected to the brakes 7 and 8, respectively, and are spring biased to effect engagement of the brakes when the fluid pressure in the actuators 9 and 10, respectively, drops below a predetermined value.

The pedal actuated valve 43 serves to enable selective application of either or both brakes 7 and 8 in response to depression of pedal 33 and also serves to automatically apply the brakes 7 and 8 when the tractor transmission 4 is operating in neutral and fluid pressure in the transmission drops below the predetermined value. Valve 43 comprises a housing 100 having an axial bore 101 therein in which a valve spool 102 is slideably mounted. Spool 102 is biased toward the right in chamber 99 by a compression spring 103 which acts in combination with transmission fluid pilot pressure supplied to a port 104 through a supply line 105 from tractor transmission 4. Rightward movement of spool 102 operates to close an annular fluid passage 106 in valve 43 communicating between chambers 107 and 108 in valve 43. Chamber 107 has a port by means of which it communicates through a fluid line 95 with fluid line 59. Chamber 108 has a port 110 by means of which it communicates through a fluid line 111 to a reservoir 112. Valve 43 comprises another passage 113 having a port 114 by means of which fluid leakage from line 105 that passes spool 102 may be returned through a line 115 to a reservoir 116 for the transmission fluid. Valve 43 also comprises an axially movable rod 120 which is connected by a linkage 121 to brake pedal 33 and has its innermost end in abutting engagement with the end of valve spool 102. Valve spool 102 is provided with a groove 123 which is in registry with the passage 113 in valve 43. When both steering control levers 31 and 32 are in neutral position both brakes 7 and 8 will be applied if either the single foot brake pedal 33 is depressed, or the transmission 4 is shifted to neutral thereby reducing the pilot pressure in line 105. In either event pressure fluid in chamber 107 escapes at a lower pressure through passage 106 to chamber 108 and to reservoir 112. Chamber 107 communicates with port 58 in shuttle valve 42. Fluid pressure from transmission hydraulic circuit line 105 acts on piston or spool 102 to urge poppet valve passage 106 closed. Spring 103 serves to achieve a proper balance between the transmission pilot pressure acting on spool 102 and the brake control pressure in lines 59 and 95 so that when transmission pilot pressure in transmission 4 and line 105 drops below a predetermined value, such as during a change in vehicle direction shift, the poppet valve passage 106 is permitted to open and release the pressure in lines 59 and 95 to reservoir 112 and in brake actuators 9 and 10, thus allowing the brake springs 27 and 28 to apply brakes 7 and 8.

Valve 43 also serves, in cooperation with sequence valve 45, to limit the system fluid pressure by permitting fluid delivered by pump 40 through lines 51 and sequence valve 45 through lines 59 and 95, chamber 107 and poppet valve passage 106 to unseat valve spool 102 at a predetermined maximum pressure and return the fluid to the system reservoir 112. It is to be understood that the pressure regulating sequence valve 45 is incorporated in steering valve 41 so that pressure in lines 59, 95 may be depleted without similar depletion of fluid pressure that is available from pump 40 for control of steering clutches 5 and 6. The importance of this is evident during several operational maneuvers of the tractor, such as when manually applying one or both brakes 7 and 8 when accompanied by the release of one or both steering clutches 5 and 6.

Manual application of the brakes 7 and 8 is accomplished by depressing the single brake pedal 33 thereby moving valve spool 102 of valve 43 to the left in the drawing against spring 103. This allows fluid in line 59 to pass through line 95 into chamber 107, through passage 106 at modulatingly controlled pressure, to chamber 108 and then to sump 112. Fluid in line 59 normally communicates with both brake actuator cylinders 9 and 10 by means of the dual passages 79 and 80 in shuttle valve 42.

If both steering clutches 5 and 6 are released simultaneously, fluid pressure in both lines 55 and 56 acts through lines 89 and 90, respectively, on opposite ends of the shuttle valve spool 72. Equalization springs 73 and 74 at both ends of spool 72, along with the equal pilot fluid pressure in the chambers 75 and 76, retain the spool in a neutral position. This allows fluid in both brake actuators 9 and 10 to escape to sump 112 and results in application of both brakes 7 and 8.

If only one steering clutch 5 or 6 is released and the brake pedal 33 is operated, then the fluid pressure used to disengage that clutch also acts on one end of the shuttle valve spool 72 to shift it in a direction to block one of the passages 79 or 80 so that fluid from only one brake actuator 9 or 10 is allowed to escape to sump 112 to effect brake application. Simulataneously, the fluid pressure used to disengage one steering clutch is also applied to maintain disengagement of the brake not associated with the one released steering clutch. This occurs because fluid pressure acting to shift the shuttle valve spool 72 is then applied through the associated one of the cross-connected lines 93 or 94 to brake actuator 9 or 10 instead of the actuator receiving fluid pressure from line 59 as occurs when the shuttle valve spool 72 is in neutral position.

It will be apparent that valve 43 can be employed in systems other than that shown in the drawing and would find utility in any system wherein the pressure level of one source of pressurized fluid is to be controlled either automatically in response to a source of pilot pressure or in response to actuation of a movable control member such as pedal 33 or the like. As hereinbefore explained, hydraulic control valve 43 comprises a housing 100 and first, second and third chambers 107, 108, and 103, respectively, in the housing. The first chamber 107 is connectable by passage 109 to receive fluid from a source of pressurized fluid whose pressure is to be controlled. The second chamber 108 communicates with the first chamber 107 through passage 106 and is connectable through passage 110 to a sump 112. The third chamber 99 is connectable through passage 104 to a source of pilot fluid. The valve spool 102 in housing 100 is movable between one position (shown in the drawing) wherein it closes communication between the first and second chambers 107 and 108 thereby maintaining fluid in first chamber 107 at a predetermined pressure level and another (leftward) position wherein it opens communication between the first and second chambers 107 and 108 thereby causing the fluid in the first chamber 107 to fall below said predetermined pressure level. The biasing means 103 in the third chamber 99 acts in conjunction with pilot fluid in the third chamber 99 to bias the valve spool 102 toward the one position shown in the drawing. The biasing means 103 is of insufficient force, in the absence of pilot fluid of a predetermined pressure level in third chamber 99 to maintain the valve spool 102 in the said one position. The actuator means 120 extends into housing 100 and is engageable with the valve spool 102 for selectively moving the valve spool toward the other position. However, member 120 is not mechanically attached to valve spool 102 and, consequently, spool 102 can move leftward in the drawing regardless of the position or condition of pedal 33.

I claim:
1. In a hydraulic control valve:
a housing;
a first chamber being connectable to receive fluid from a source of pressurized fluid whose pressure is to be controlled and having a discharge outlet;
a second chamber being connectable to a source of pilot fluid;
a valve spool in said housing and movable between one position wherein it closes said discharge outlet of said first chamber thereby maintaining fluid in said first chamber at a predetermined pressure level and another position wherein it opens said discharge outlet thereby causing the fluid in said first chamber to fall below said predetermined pressure level;
biasing means in said second chamber for acting in conjunction with said pilot fluid in said second chamber to bias said valve spool toward said one position;
said biasing means being of insufficient force in the absence of pilot fluid of a predetermined pressure level to maintain said valve spool in said one position; and
actuator means extending into said first chamber and in coaxial arrangement with said valve spool for selectively moving said valve spool toward said other position, said actuator means being releasably engageable with said valve spool so that said valve spool can be moved independently of said actuator means.

2. A hydraulic control valve according to claim 1 including a third chamber for receiving pilot fluid leakage from said second chamber past said valve spool.

3. A hydraulic control valve according to claim 2 including a fourth chamber connected to said first chamber, and wherein said discharge outlet communicates between said first and fourth chambers.

4. A hydraulic control valve according to claim 3 wherein said third and fourth chambers are connected to respective reservoirs.

5. In a hydraulic control valve:
a housing;

first, second, third and fourth chambers in said housing;

said first chamber being connectable to receive fluid from a source of pressurized fluid whose pressure is to be controlled;

said second chamber communicating with said first chamber and being connectable to a sump;

said third chamber being connectable to a source of pilot fluid;

a valve spool in said housing and movable between one position wherein it closes communication between said first and second chamber thereby maintaining fluid in said first chamber at a predetermined pressure level and another position wherein it opens communication between said first and second chambers thereby causing the fluid in said first chamber to fall below said predetermined pressure level;

said fourth chamber being connected to receive pilot fluid leakage past said valve spool from said third chamber and being connectable to a sump;

biasing means in said third chamber for acting in conjunction with said pilot fluid in said third chamber to bias said valve spool toward said one position;

said biasing means being of insufficient force in the absence of pilot fluid of a predetermined pressure level to maintain said valve spool in said one position; and actuator means extending into said first chamber and in coaxial arrangement with and engageable with said valve spool for selectively moving said valve spool toward said other position, said actuator means being releasably engageable with said valve spool so that said valve spool so that said valve spool can be moved independently of said actuator means.

6. In a hydraulic control valve:
a housing;
a bore extending through said housing and having a closed end and an open end;

said bore being enlarged at axially spaced apart intervals therealong to define first, second and third fluid chambers;

a valve spool slideably mounted in said bore and having an inner end and an outer end and a groove intermediate the ends thereof;

biasing means disposed in a fourth chamber located between the closed end of said housing and the inner end of said spool, said biasing means tending to bias said spool toward said open end of said bore into a position wherein said groove in said valve speed registers with said first fluid chamber and wherein said valve spool closes communication between said second and third fluid chambers, said first chamber receiving pilot fluid leakage from said fourth chamber;

first, second, third and fourth passages through said housing communicating with said first, second, third and fourth fluid chamber, respectively, and said first and second passages being for communication with respective reservoirs; and a valve spool actuator extending into said open end of said bore and in coaxial arrangement with and engageable with said outer end of said valve spool to move said spool toward said closed end of said bore, said valve spool actuator also serving to close said third fluid chamber, said valve spool actuator being releasably engageable with said valve spool so that said valve spool can be moved independently of said actuator means;

said third chamber being adapted to receive pressurized fluid from a first source through said third passage, said fourth chamber being adapted to receive pressurized pilot fluid from a second pilot fluid source through said fourth passage, said control valve being operable to reduce fluid pressure in said third chamber to effect a control function in response to either a reduction in fluid pressure in said fourth chamber or in response to movement of said valve spool by said valve spool actuator toward said closed end of said bore.

* * * * *